United States Patent
Bhat et al.

(10) Patent No.: US 12,192,245 B2
(45) Date of Patent: Jan. 7, 2025

(54) CONTROL OF CLOUD INFRASTRUCTURE CONFIGURATION

(71) Applicant: ServiceNow, Inc., Santa Clara, CA (US)

(72) Inventors: Ganesh Parameshwar Bhat, Bangalore (IN); Ramkumar Devanathan, Bangalore (IN); Meenakshi Parameswaran, Bangalore (IN)

(73) Assignee: ServiceNow, Inc., Santa Clara, CA (US)

( * ) Notice: Subject to any disclaimer, the term of this patent is extended or adjusted under 35 U.S.C. 154(b) by 174 days.

(21) Appl. No.: 18/100,172

(22) Filed: Jan. 23, 2023

(65) Prior Publication Data
US 2024/0250990 A1   Jul. 25, 2024

(51) Int. Cl.
*H04L 9/40* (2022.01)
*H04L 41/22* (2022.01)

(52) U.S. Cl.
CPC .............. *H04L 63/20* (2013.01); *H04L 41/22* (2013.01); *H04L 63/0435* (2013.01)

(58) Field of Classification Search
CPC ...... H04L 63/20; H04L 41/22; H04L 63/0435
See application file for complete search history.

(56) References Cited

U.S. PATENT DOCUMENTS

| | | |
|---|---|---|
| 4,941,084 A | 7/1990 | Terada et al. |
| 5,185,860 A | 2/1993 | Wu |
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |

(Continued)

FOREIGN PATENT DOCUMENTS

| | | |
|---|---|---|
| EP | 0433979 | 6/1991 |
| EP | 1607824 | 12/2005 |

(Continued)

OTHER PUBLICATIONS

Kikuchi, Shinji, et al. "Configuration Policy Extraction for Parameter Settings in Cloud Infrastructure Using UML/OCL Verification." 2013 IEEE Sixth International Conference on Cloud Computing. IEEE. (Year: 2013).*

(Continued)

*Primary Examiner* — John M MacIlwinen
(74) *Attorney, Agent, or Firm* — McDonnell Boehnen Hulbert & Berghoff LLP

(57) ABSTRACT

An example embodiment may involve determining, based on a predefined policy, one or more configuration settings, wherein the predefined policy specifies a permitted value of a key within the configuration settings; obtaining, from a cloud-based service provider, an actual value of the key; determining, by applying the predefined policy, that the actual value of the key does not match the permitted value of the key; identifying a remediation for the key that includes determining an updated value of the key, wherein the updated value of the key satisfies the predefined policy; and causing the updated value to be applied to the key in the cloud-based service provider.

16 Claims, 11 Drawing Sheets

(56) References Cited

U.S. PATENT DOCUMENTS

| | | |
|---|---|---|
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,836,794 B1 | 12/2004 | Lucovsky |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,908,348 B2 | 3/2011 | Kumar |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 8,910,278 B2 | 12/2014 | Davne et al. |
| 9,053,460 B2 | 6/2015 | Gilbert et al. |
| 9,560,079 B1 | 1/2017 | Lucovsky |
| 9,645,815 B2 | 5/2017 | Bennah |
| 9,906,533 B2 | 2/2018 | Kranz |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,005,972 B2 * | 5/2021 | Sarisky .................. H04L 69/40 |
| 11,089,115 B2 | 8/2021 | Garty et al. |
| 11,095,506 B1 | 8/2021 | Erblat et al. |
| 11,240,329 B1 | 2/2022 | Jain |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0182656 A1 | 9/2003 | Leathers |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0083398 A1 | 3/2009 | Ford |
| 2009/0088875 A1 | 4/2009 | Baier et al. |
| 2009/0228984 A1 | 9/2009 | Sterin |
| 2010/0110932 A1 | 5/2010 | Doran et al. |
| 2010/0180270 A1 | 7/2010 | Williams |
| 2010/0250779 A1* | 9/2010 | B'Far ...................... G06F 21/10 |
| | | 715/234 |
| 2011/0145789 A1 | 6/2011 | Rasch |
| 2011/0225275 A1* | 9/2011 | Shah .................. H04L 41/0816 |
| | | 709/223 |
| 2013/0117424 A1 | 5/2013 | Colyer |
| 2014/0280805 A1 | 9/2014 | Sawalha |
| 2015/0347173 A1 | 12/2015 | Shen |
| 2016/0357424 A1 | 12/2016 | Pang |
| 2018/0123940 A1 | 5/2018 | Rimar et al. |
| 2018/0227175 A1 | 8/2018 | Lederer |
| 2018/0322558 A1 | 11/2018 | Padmanabh et al. |
| 2019/0104398 A1 | 4/2019 | Owen et al. |
| 2019/0141144 A1 | 5/2019 | Africa et al. |
| 2020/0050689 A1 | 2/2020 | Tal et al. |
| 2020/0177613 A1* | 6/2020 | Nilangekar ........... G06F 21/577 |
| 2020/0204443 A1 | 6/2020 | Bar Oz et al. |
| 2020/0382441 A1* | 12/2020 | Barnum ................ H04L 47/783 |
| 2021/0014256 A1* | 1/2021 | Malhotra ............ H04L 63/1425 |
| 2021/0194764 A1 | 6/2021 | Badyan et al. |
| 2022/0029886 A1 | 1/2022 | Hameiri et al. |
| 2022/0179946 A1 | 6/2022 | Parameshwaran |
| 2022/0229657 A1* | 7/2022 | Hussain .............. H04L 41/0895 |
| 2023/0019705 A1 | 1/2023 | Zettel, II |

(56) References Cited

U.S. PATENT DOCUMENTS

| | | | | |
|---|---|---|---|---|
| 2023/0102477 A1* | 3/2023 | Graves | ............... | G06F 8/427 |
| | | | | 717/143 |
| 2023/0141524 A1* | 5/2023 | Giles | ............... | G06F 8/71 |
| | | | | 717/121 |

FOREIGN PATENT DOCUMENTS

| WO | WO 99/34285 | 7/1999 |
|---|---|---|
| WO | WO 00/52559 | 9/2000 |
| WO | WO 01/79970 | 10/2001 |

OTHER PUBLICATIONS

Vaishnavi, Ishan, Riccardo Guerzoni, and Sergio Beker. "An architecture for co-ordinated monitoring for multi-provider cloud platforms." 2014 IEEE Globecom Workshops (GC Wkshps). IEEE. (Year: 2014).*

Office Action, U.S. Appl. No. 17/368,568, mailed Apr. 26, 2023.

ServiceNow, Tokyo IT Operations Management, Jan. 2, 2023.

* cited by examiner

FIG. 7B

CONTROL OF CLOUD INFRASTRUCTURE CONFIGURATION

BACKGROUND

As organizations move more and more of their computing resources to cloud-based services, new challenges have emerged with respect to the configuration thereof. In particular, these configurations can have settings that are hard to understand and/or spread across multiple locations. Some settings are poorly documented or effectively hidden from most users. As a consequence, cloud-based computing resources are often configured in a way that is unintended or wrong, exhibits security issues, or deviates from the organization's or its industry's best practices.

SUMMARY

The embodiments herein overcome these and potentially other drawbacks in the state of the art by providing a simplified and flexible way of managing cloud configurations and enforcing policies thereon. In doing so, misconfigurations are readily identified and can be automatically corrected or flagged for review. These embodiments may include facilities for specification of policies and enforcement regimes in a low-code or no-code fashion, in addition to allowing specification through traditional coding. The solutions provided can be both proactive (e.g., analyzing configuration templates prior to deployment) and reactive (detecting problems in deployed configurations).

Accordingly, a first example embodiment may involve determining, based on a predefined policy, one or more configuration settings, wherein the predefined policy specifies a permitted value of a key within the configuration settings; obtaining, from a cloud-based service provider, an actual value of the key; determining, by applying the predefined policy, that the actual value of the key does not match the permitted value of the key; identifying a remediation for the key that includes determining an updated value of the key, wherein the updated value of the key satisfies the predefined policy; and causing the updated value to be applied to the key in the cloud-based service provider.

A second example embodiment may involve a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7B depicts a low-code interface for defining a configuration policy, in accordance with example embodiments.

DETAILED DESCRIPTION

Figure 1:
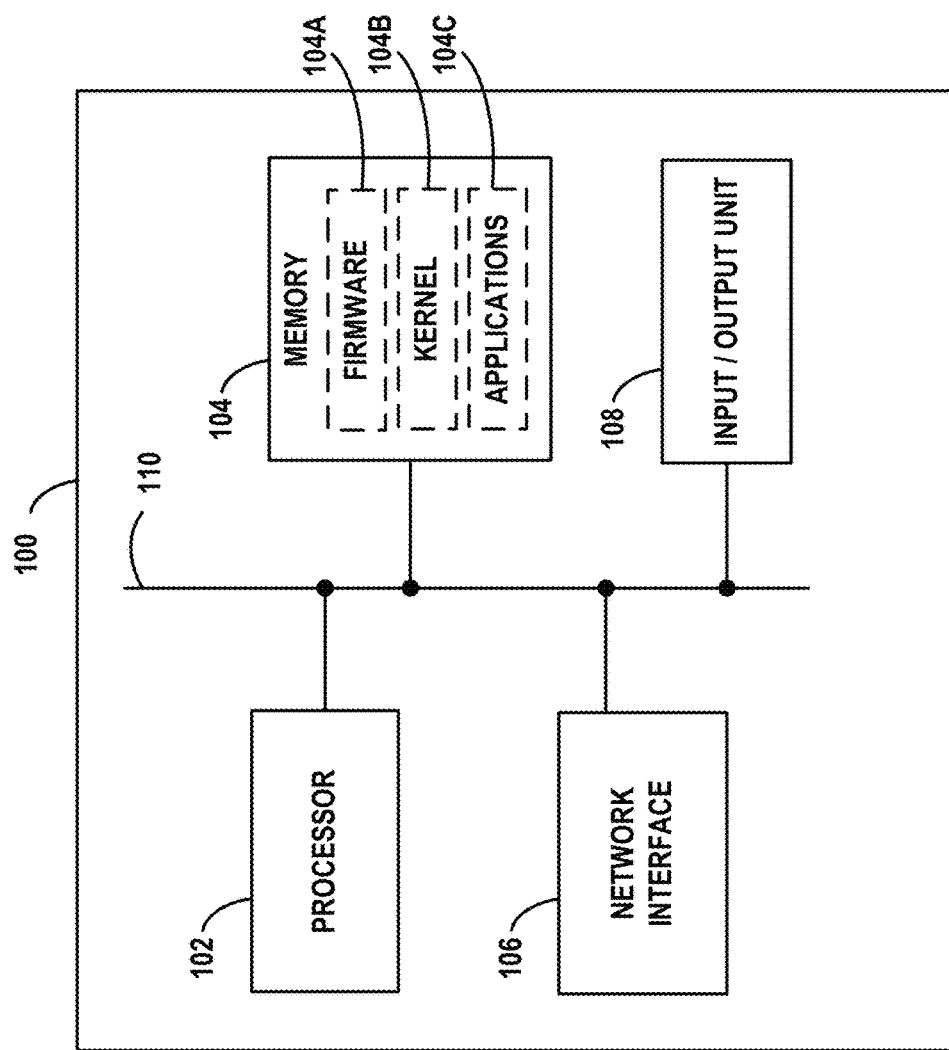
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
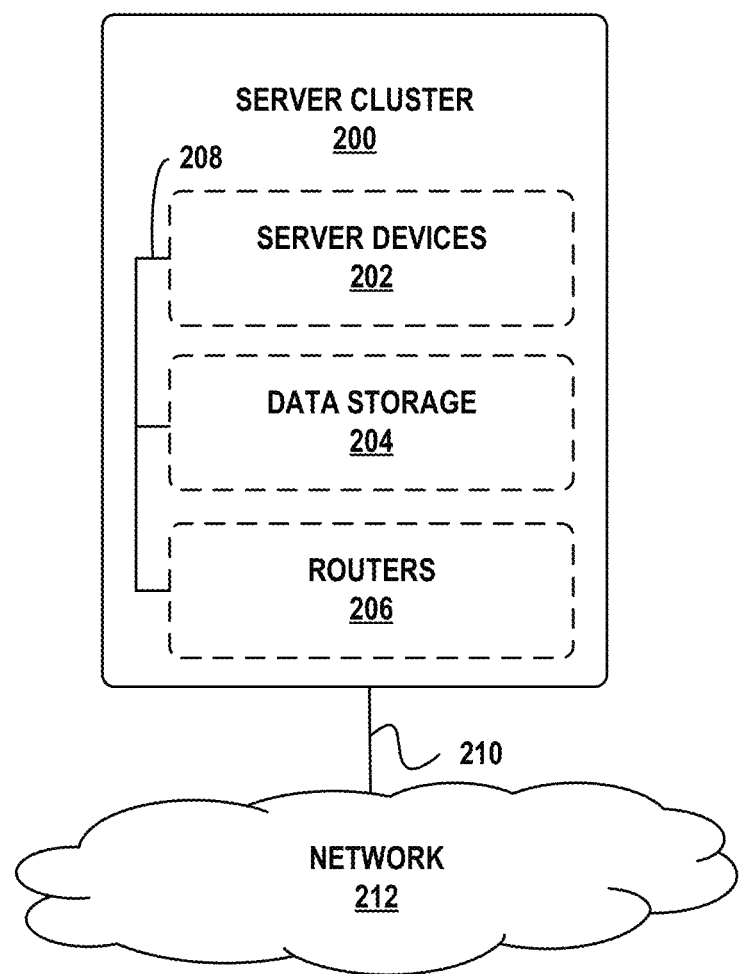
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
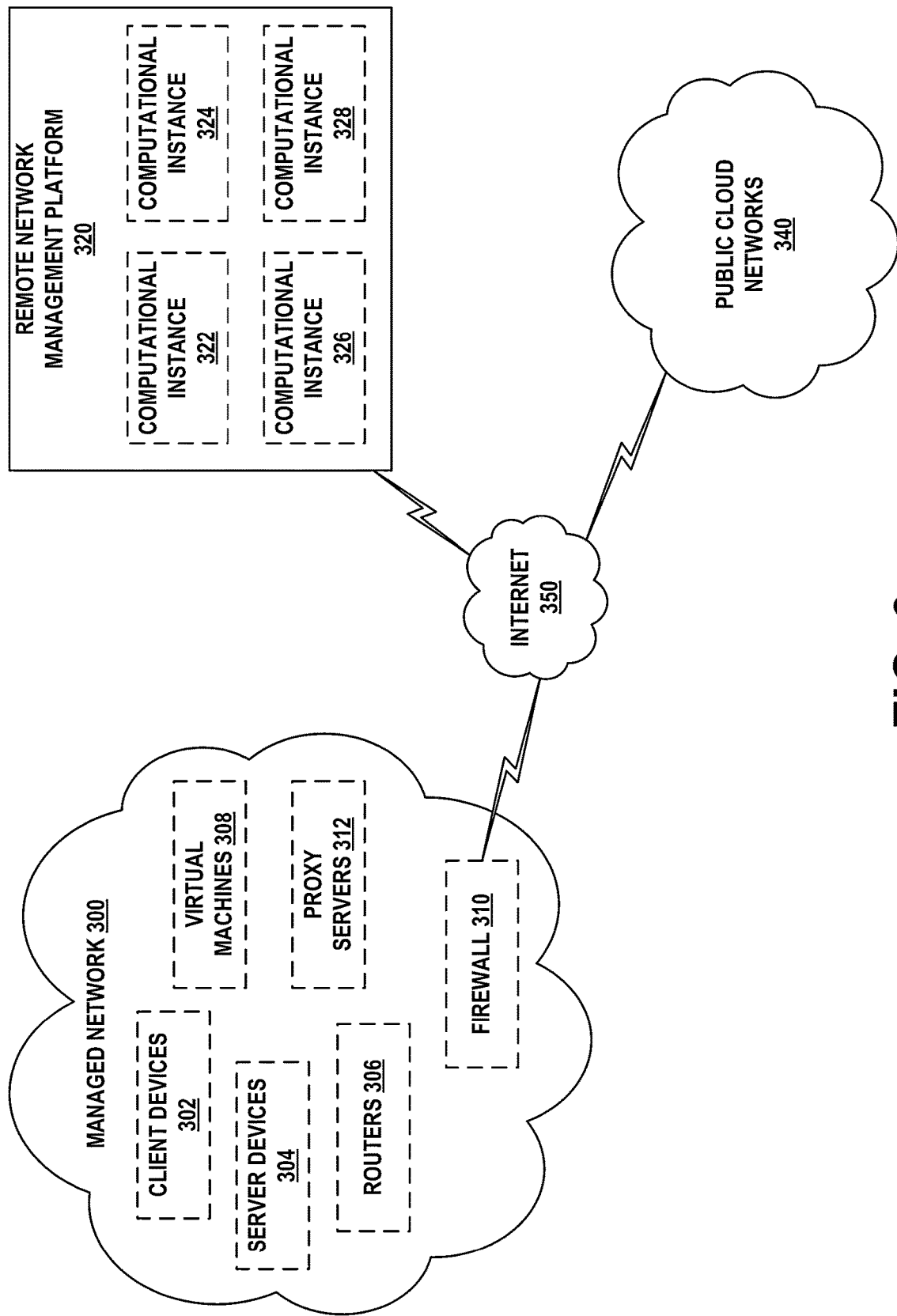
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
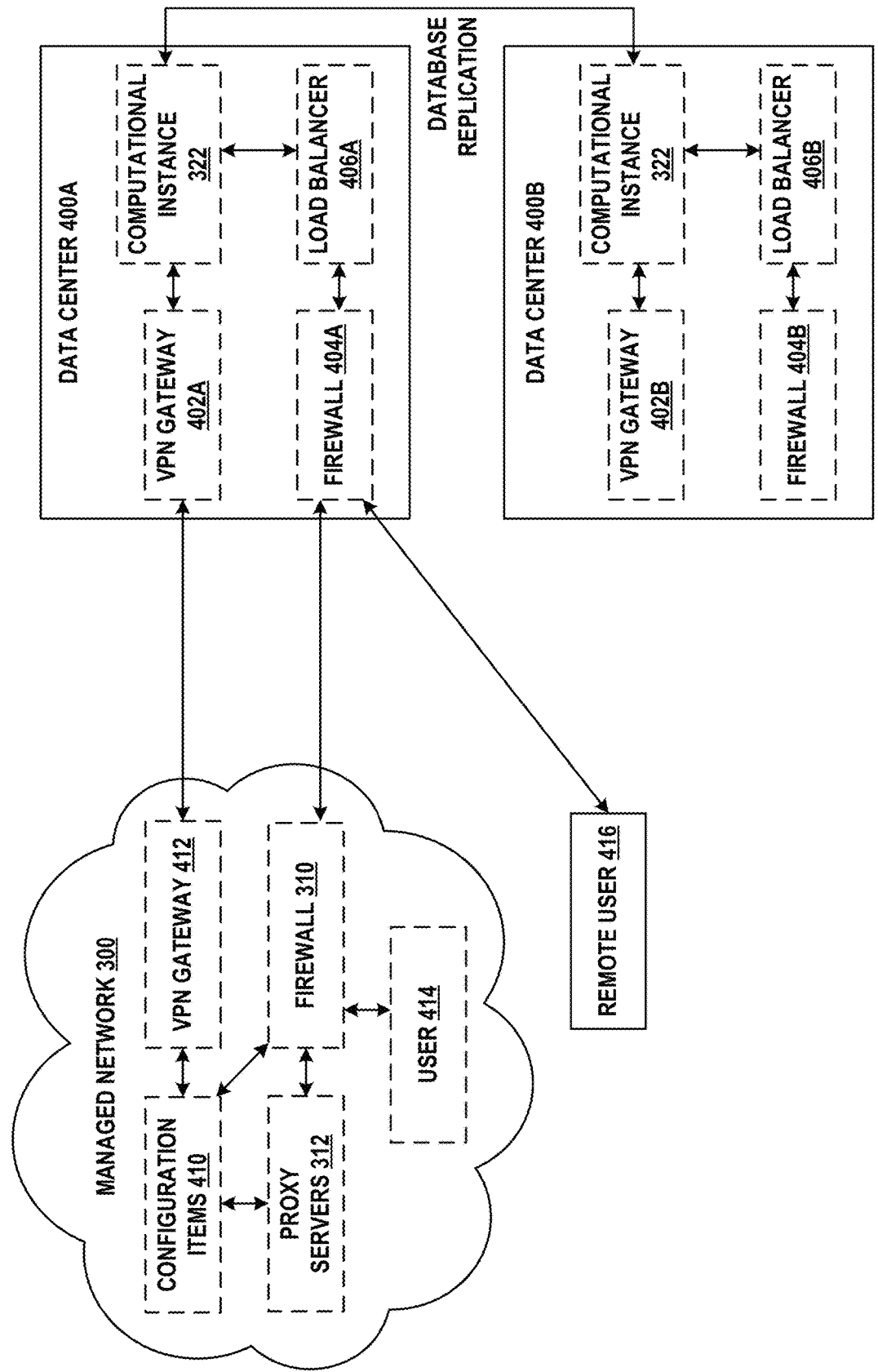
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
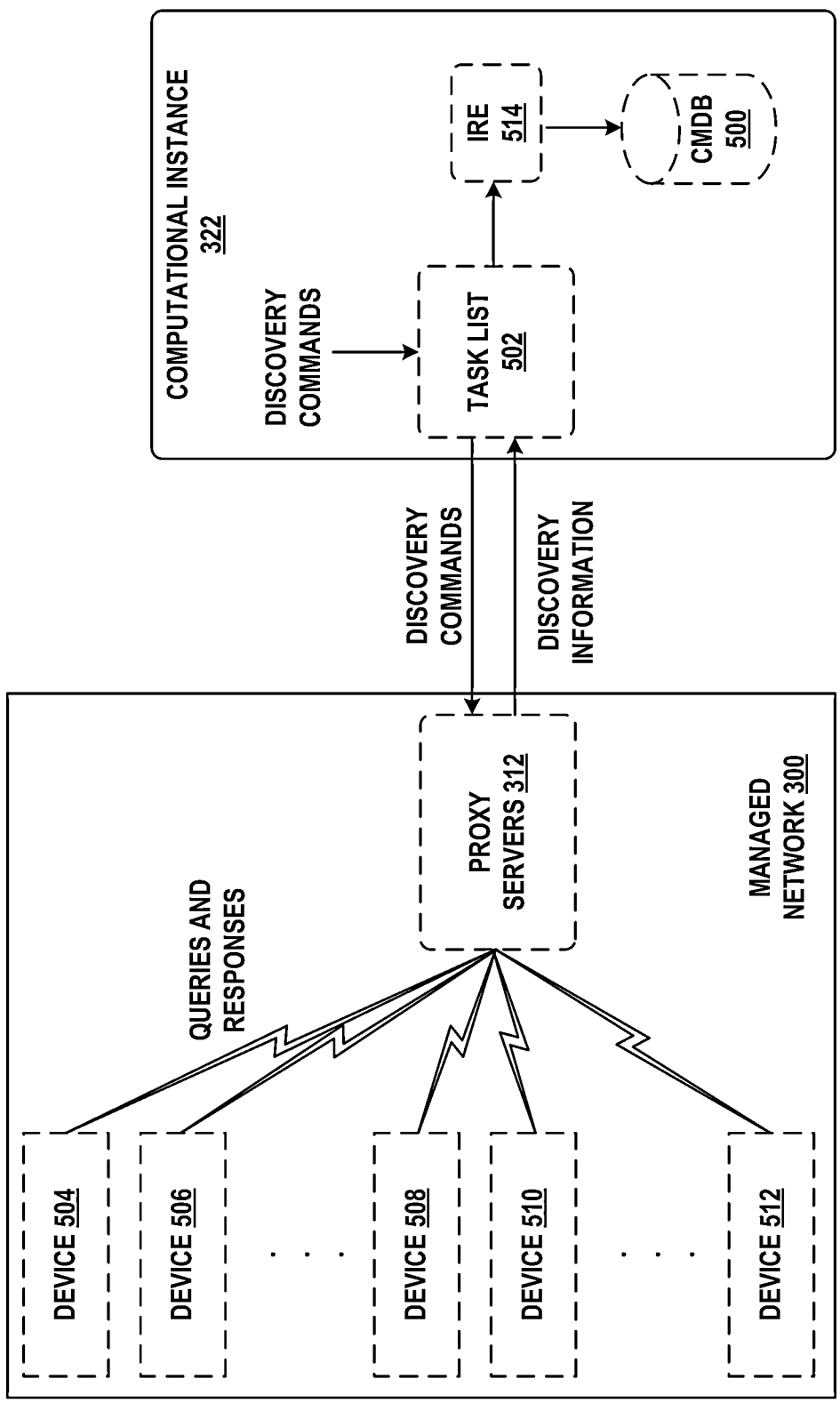
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Cloud Infrastructure Configuration Settings and Policy Enforcement

The cloud-based computing infrastructure described herein may be deployed in one or more public cloud networks (e.g., AWS, Azure, or GCP), private networks, or in some other fashion. This infrastructure may include computing resources such as processors, volatile memory (e.g., RAM), non-volatile memory (e.g., long term storage such as disk drives or solid state drives), networking capacity, virtual machines, virtual storage, load balancers, networks and subnets, network addresses, and so on. Various arrangements of these resources can be employed to provide services to users and/or organizations, possible services including web sites, file storage, email, and so on.

The configuration of these resources is often achieved by way of web-based interfaces or various application programming interface (API) calls. Currently, there is no standardized technique for applying configurations across different cloud infrastructure providers. Thus, each provider may have its own groupings of settings that are accessed in different ways. For example, the functionality, location, and naming of similar settings on AWS and Azure can be dramatically different from one another. Thus, it can be challenging for all but the most experienced of users to be able to identify which settings are relevant to their deployment scenarios and how to administer those settings so that computing resources are properly configured. In some cases, documentation for certain settings may be unavailable, incomplete, or unclear, effectively hiding these settings or their impact from users.

As a consequence, cloud-based computing resources are often misconfigured in various ways, leading to improper operation, security vulnerabilities that could be exploited by a third party, and/or deviation from best practices. Without being able to readily detect such misconfigurations, they can remain in place for weeks, months, or years.

Examples of common misconfigurations include units of long term storage (e.g., AWS S3 buckets) being open for public access or not encrypted, user credentials or keys not being regularly rotated, access to certain subnets not being restricted to only devices or users who need to use that subnet, unrestricted deployment of any type of virtual machine image, unmonitored production environments for services, and improperly configured IP addresses (e.g., use of public IP addresses where a private IP address should be used or vice versa). Other possibilities exist.

Here, an image is a combination of executable code and/or non-executable settings that can deployed as part of one's cloud infrastructure. Often, there are several available images for different types of cloud resources (e.g., virtual machines) and each image may have different characteristics. For instance, some versions of images may correct defects in previous versions, and some types of images may take up more or less storage space than others. Organizations may prefer that images with defects corrected and that use less storage space be used instead of other options.

The embodiments herein address these and possibly other limitations of current systems by allowing users to easily specify policies using low-code, no-code, or advanced coding techniques. In this manner, arbitrarily complex policies can be specified using simple building blocks that most users will readily understand even if they are not software engineers. These policies may be applied to configurations of cloud computing resources before or after deployment of these configurations to a cloud provider. For example, the policies could be applied to settings prior to deployment, or could be applied in a reactive manner by scanning deployed computing resources in a manual or scheduled fashion, upon deployment, and/or in response to receiving events from a cloud provider. Detected misconfigurations are reported, and can be automatically corrected (if such a correction is known and can be programmed) or assigned for manual review and remediation.

Policies may be defined in terms of keys. Each key is an individual configurable setting of the cloud infrastructure, typically having a name and a value. Thus, keys may also be referred to as key-value pairs, maps, settings, configurable values, etc. The name uniquely identifies the key, and the value can be a Boolean, integer, real number, associative map, text string, bitstring, date, time, predefined value selectable from a list of possible values, or some other form of data assigned to the key, such as a range or regular expression. For example, a key storing the IP address of a service may have a name "service address" and a value of "192.168.0.5". The value in this example could be stored in a text string or a 32-bit integer. While keys are considered to be individually manipulated herein, they may take more complicated forms in cloud infrastructure. For instance, sets of keys may be stored in large JavaScript Object Notation (JSON) or XML files while others may be accessible by way of an API call.

Figure 6:
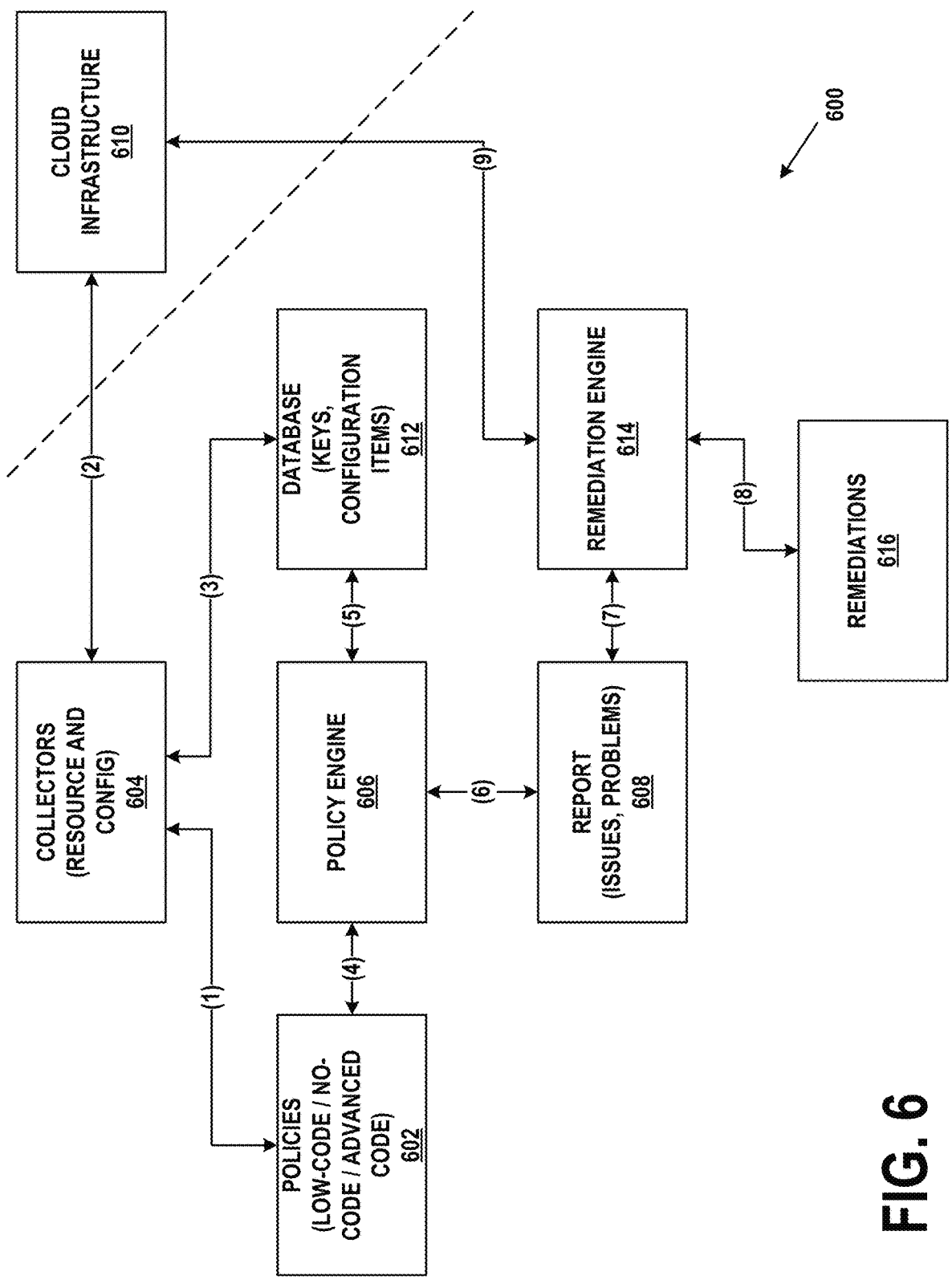
FIG. 6 depicts an architecture for configuration policy evaluation and remediation, in accordance with example embodiments.

A hardware/software architecture 600 for supporting these embodiments is shown in FIG. 6. The software components include collectors 604, policy engine 606, and remediation engine 614. Policies 604 may be considered to be software in some cases and data in others (described below). Reports 608, database 612, and remediations 616 may be considered to be data, though programmatic logic may reside in or be used to process any of these components.

All components of FIG. 6 aside from cloud infrastructure 610 may be disposed within a remote network management platform, a managed network, or some combination thereof. Cloud infrastructure 610 may be deployed in a public cloud network (e.g., AWS, Azure, or GCP) or otherwise separately and distinctly from the rest of the components. This is illustrated in FIG. 6 by the dashed line separating cloud infrastructure 610 from the rest of the architecture.

Policies 602 include one or more policies, each of which may be expressed in terms of Boolean logic, algebraic expressions, program code, and/or in some other fashion. Such a policy may define a requirement or desired state that should be reflected by keys having certain values in cloud infrastructure 610. For example, Boolean logic might specify that a certain key should take on a certain value, or that a certain combination of keys should take on a certain combination of values. This logic can then be applied by policy engine 606 to check whether the specified condition(s) are true. Alternatively or additionally, policies 602 may include one or more scripts that can be executed by policy engine 606.

In general, policies 602 can take the form of no-code, low-code, or advanced code specifications. No-code specifications involve the user navigating a graphical user interface to define logical and/or algebraic conditions or tests. Low-code specifications are based on scripts or portions of scripts that are auto-generated by a system (e.g., by remote network management platform) and that may be modified by a user. Advanced code specifications incorporate free-form software coding on the part of the user.

Figure 7A:
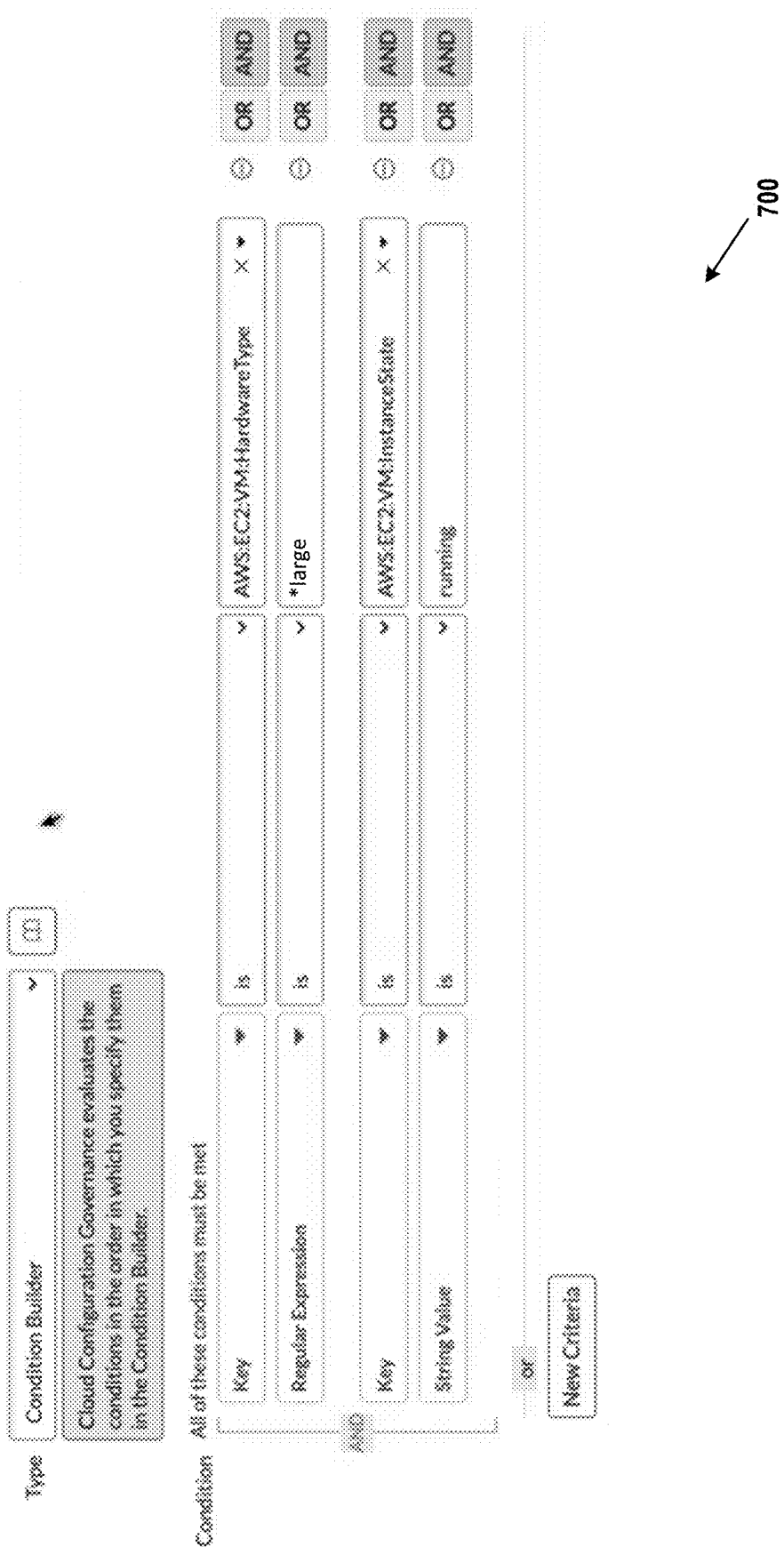
FIG. 7A depicts a no-code interface for defining a configuration policy, in accordance with example embodiments.
Figure 7B:
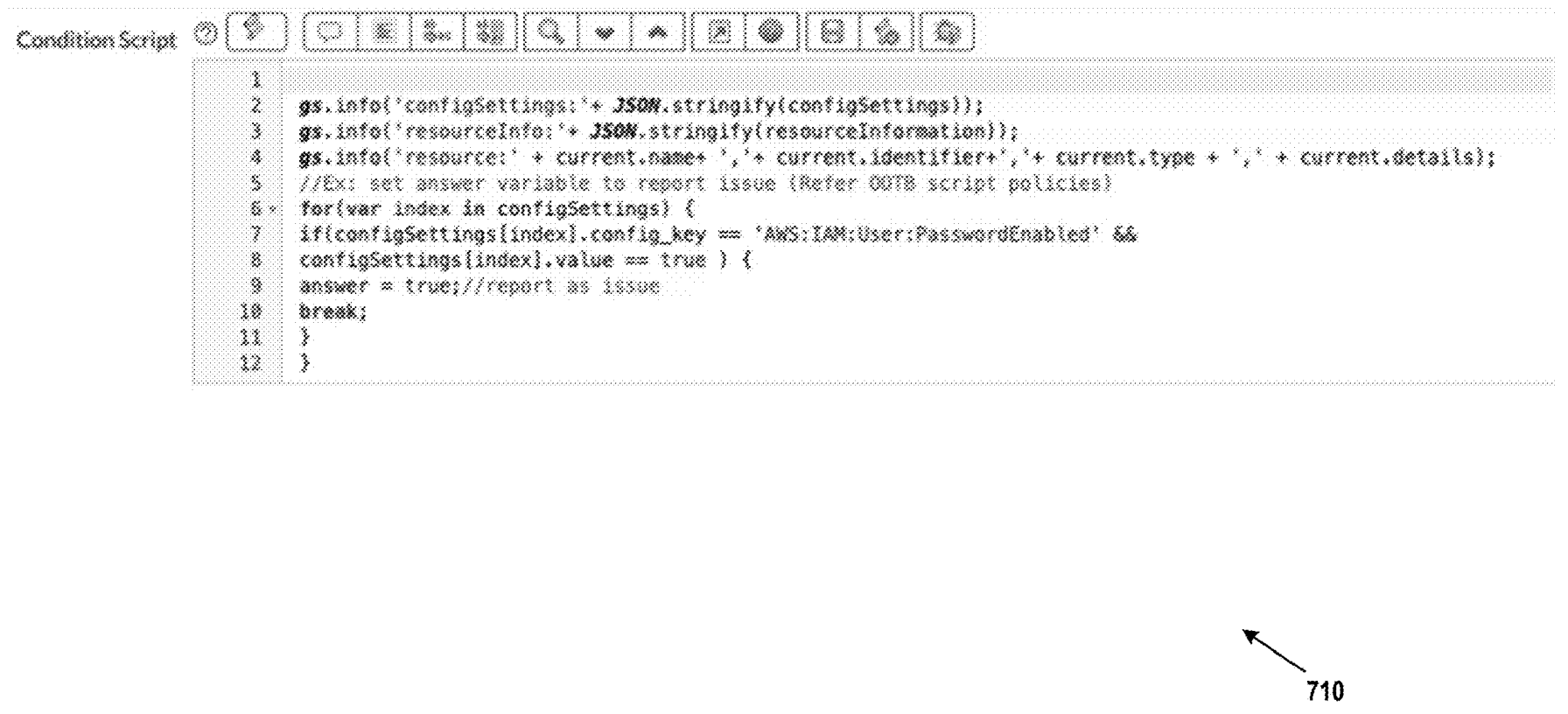

As examples, FIGS. 7A and 7B respectively depict web-based interfaces for specification of policies in a no-code and a low-code manner. Examples of advanced coding are not shown, as they involve custom coding that can be implemented in various programming languages across a wide range of APIs, all of which would be understood by one of ordinary skill in the art who is provided with the appropriate documentation.

FIG. 7A depicts a no-code interface 700, in which a policy has been specified using a Boolean expression involving two keys. For this policy to be satisfied, the value of the "AWS:EC2: VM:HardwareType" key needs to match the regular expression "*large" and the value of the "AWS:EC2: VM:InstanceState" key needs to be "running". By way of no-code interface 700, even an inexperienced user can specify complex policies in terms of Boolean and/or arithmetic logic.

FIG. 7B depicts a low-code interface 710, in which an executable script has been automatically generated at the request of a user. The user can then manually edit this script to incorporate desired policies. For example, lines 2-6 and 12 of the script may have been automatically generated in response to a user requesting generation of code that involves iterating through all settings. The user may have then provided lines 7-11, which include logic that checks whether the value of the "AWS:IAM: User: PasswordEnabled" key is "true". By way of low-code interface 710, a more experienced user with at least some coding experience can specify more complex policies than through use of no-code interface 700.

Turning back to FIG. 6, one or more policies may be associated with schedules that define a time of day, day or week, and/or frequency at which a policy is to be executed by policy engine 606. Alternatively, the execution of any policy can be manually invoked by way of a web-based interface or programmatically invoked.

Collectors 604 include software modules or applications that access cloud infrastructure 610 to obtain the values associated with one or more keys. Each collector 604 may be specifically designed for a particular cloud provider, and may be configured to obtain values associated with keys on that cloud provider (e.g., via accessing a file or by way of an API call). Collectors 604 may be further configured to parse and/or filter the information supplied by cloud infrastructure 610 to locate the value associated with a specific key when more than just that value is provided by cloud infrastructure 610. An example of this might be a collector 604 receiving a JSON or XML file containing a desired key-value pair among dozens or hundreds of other key-value pairs, and parsing the file to locate and read the desired key-value pair.

The system (e.g., the remote network management platform) may include a mapping that associates keys with collectors 604 that can be used to obtain their values. After obtaining values, collectors 604 may write the key names and their associated values (among other possible information) to database 612.

Policy engine 606 includes one or more software modules or applications that are configured to execute policies 602. Thus, policy engine 606 may obtain one or more policies from policies 602, obtain one or more keys from database 612, and apply the policies to the keys. If the value of the key as stored in database 612 matches or is encompassed by that of the corresponding policy, then the key is compliant with the policy. Otherwise, the key is not compliant with the policy. Policy engine 606 may be further configured to generate report 608 and include in it at least indications of non-compliant keys. In order to perform these operations, policy engine 606 might be quite complex. For instance, policy engine 606 might execute a large number of computations including set manipulations and query optimizations.

To that point, report 608 may include a list of all non-compliant keys and possibly a brief description of why they are non-compliant (e.g., the actual value of the key does not match, is out of range, or is in a different format from that which is defined in the policy). Report 608 may also include a list of all compliant keys, possibly with indications of compliance.

Cloud infrastructure 610 represents one or more cloud-based service providers. As noted above, each such cloud-based service provider may make computing resources available to users. Configuration settings (keys) in cloud infrastructure 610 may define how these resources are assigned and how they operate. Values associated with these keys may be accessible by downloading them in the form of one or more files, by way of API calls, or by way of a command line interface, for example. As an example, cloud infrastructure 610 may support a representational state transfer (REST) API that allows one or more settings to be retrieved in the form of a JSON specification or file.

Database 612 may be a CMDB or another type of database with tables that can be used for storing keys. Each table entry may identify the key's name, value, and possibly any associated configuration item(s), in columns. Database 612 may receive such representations of keys from collectors 604 and provide these representations to policy engine 606.

Remediation engine 614 may be a software module or application that executes remediations 616. In doing so, remediation engine 614 may obtain at least parts of report 606 and remediations 616, then access cloud infrastructure 610 and change the values of one or more keys. For example, if a key is listed as non-compliant in report 606, there may be a remediation in remediations 616 that can be used to change the key so that it has a compliant value. Remediation engine 614 may write new values to keys in cloud infrastructure 610 by uploading them in the form of one or more files, by way of API calls, or by way of a command line interface, for example. If a remediation for a particular non-compliant key cannot be found in remediations 616 or if remediations 616 specifies that a remediation can be carried out manually, remediation engine may notify the appropriate users (e.g., via messaging, email, etc.) that a manual remediation may be necessary.

Before applying any remediations to cloud infrastructure 610, remediation engine 614 may invoke a change management process. In doing so, remediation engine 614 may supply the name of the key, its current value, its proposed new value, and a reason for the change to a change tracking application. Then, remediation engine 614 may wait until the change is approved before proceeding to make the change. Alternatively, human users may make the change manually and then indicate via the change management process that the change has been made.

Remediations 616 may include Boolean logic, algebraic expressions, and/or programming code that can be used by remediation engine 614 to change keys in cloud infrastructure 610. Thus, some remediations may include data that remediation engine 614 uses to update the values of keys in cloud infrastructure 610, and some may include code executed by remediation engine 614 to make such updates while other may involve receiving updates from human users.

In some cases, applying remediations 616 may involve determining that multiple possible remediation options exist that satisfy the applicable policy, and selecting one (or more) of those options to apply. For example, if there are two possible remediation options, one of these might be selected automatically based on other factors known or gathered relating to the configuration. Or, a human user may be prompted to select one of these options.

The following nine-step process puts together the aforementioned features into a system that can detect policy violations and take steps toward their remediation. Nonetheless, in some embodiments more or fewer steps could be used.

Step 1 may involve the system (e.g., a remote network management platform) invoking collectors 604 to obtain the values of keys specified in policies 602. As noted, each key may be associated with a collector that is configured to obtain the value of that key. Thus, to evaluate a given policy, one or more collectors may be invoked.

Step 2 may involve these collectors accessing cloud-based infrastructure 610 to obtain copies of the values. Doing so may involve one or more of collectors 604 making one or more API calls. Such an API call may involve a request transmitted to cloud infrastructure 610 that specifies the keys for which values are sought, and a reply transmitted by cloud infrastructure 610 that specifies the associated values. In some cases, a general request may result in the values of a set of keys being provided. The values and/or their keys may be represented in JSON or XML format, for example.

Step 3 may involve collectors 604 storing representations of the keys, their values, and possibly other information related thereto in database 612. For example, there may be one or more dedicated tables in database 612 for storing this information at least on a temporary basis.

Step 4 may involve policy engine 606 obtaining policies 602, and step 5 may involve policy engine 606 obtaining the stored keys and their associated values from database 612. Policy engine 606 may then check, for every policy that specifies the desired value of a key, whether that key's actual value as obtained from database 612 matches its desired value. As noted, some desired values may be defined as a range or as a regular expression, and thus multiple actual values could match such a definition.

Step 6 may involve policy engine 606 providing report 608. This report may be in textual form, possibly as a structured text file (e.g., JSON or XML). Policy engine 606 may indicate in report 608, for each value of a key that violates a policy, that the policy has been violated, the name of the key, and its value. In some cases, report 608 may also include the names and/or values of keys that do not violate any policy.

Step 7 may involve remediation engine 614 obtaining information regarding policy violations from report 608. Step 8 may involve remediation engine 614 obtaining remediations relevant to the policy violations from remediations 616. For example, each policy violation may be specified along with a unique policy violation code in report 608 (e.g., a policy violation involving publicly-accessible storage may be tagged with the text string "POLICY_ERR 1" and a policy violation involving unencrypted storage may be tagged with the text string "POLICY_ERR 2").

Each remediation may specify a value, program code, or logic that can be used by remediation engine 614 to change the value of a key causing a policy violation to a policy-complaint value. For instance, for keys associated with the tag "POLICY_ERR 1", the remediation may specify new values for these keys that comply with the policies violated. But in some cases, remediation engine 614 may flag at least some of the policy violations that it finds in report 608 for human review and remediation. For example, a particular policy may indicate that a given key must specify a public IP address. Report 608 may indicate that this key is improperly configured with a private IP address, but remediation engine 614 may not know which public IP address should be used instead. Thus, remediation engine 614 initiate a notification and/or escalation process in which one or more users are notified of the policy violation.

To that end, remediation engine 614 may be integrated in some fashion with a change management system. Such a system can involve change requests for values of keys being opened in a database and assigned to users for review and resolution. Such a change request may be routed to an appropriate user who determines whether the policy violation is indeed a problem, and if so determines how to remediate it. A proposed remediation may have to pass through one or more levels of approval before being made. One the remediation is made, the user to whom it was assigned marks it as completed in the change management system. The change management system may record logs of all activities related to a change request so that there is traceability for changes made to settings in cloud infrastructure 610.

Thus, step 9 may involve remediation engine 614 directly or indirectly causing one or more updates to be made to values of keys stored in cloud infrastructure 610. As discussed, these updates may be made in response to determining that the previous values of the keys were causing policy violations.

The capabilities provided by architecture 600 have numerous technical advantages and improvements over the state of the art. For example, it is common for units of storage (e.g., files, virtual disks, or buckets) to be accidentally left publicly-readable for weeks, months, or even longer. This type of policy violation is significant, because it impacts the security of data stored in cloud infrastructure 610. If the units of storage contain personally-identifying information (PII), such as names, email addresses, government identifiers, financial data, and so on, it is critical that this data be secured by making it unreadable except to authorized accounts or encrypted. Without the embodiments herein, this form of policy violation may remain undetected. But with these embodiments, a policy can be executed regularly (e.g., scheduled each hour) to automatically identify the policy violation and immediately correct it or flag it for correction on an urgent basis. As a consequence, the security of data in cloud infrastructure 610 is dramatically improved.

Further, the embodiments herein cannot practically be performed manually by human users. Given that a typical cloud infrastructure account or set of accounts could contain thousands or tens of thousands of settings that would need to be checked every few minutes or hours, a human user would be unable to complete such a check in anywhere near these allotted times. As a consequence, manual performance of the policy enforcements described herein would not have the aforementioned security advantages.

Another technical advantage of the embodiments herein is that new policies or modified policies can be tested on previously collected key-value pair data stored in the database. This allows testing of policies in a controlled fashion without requiring that the cloud infrastructure be accessible.

Figure 8:
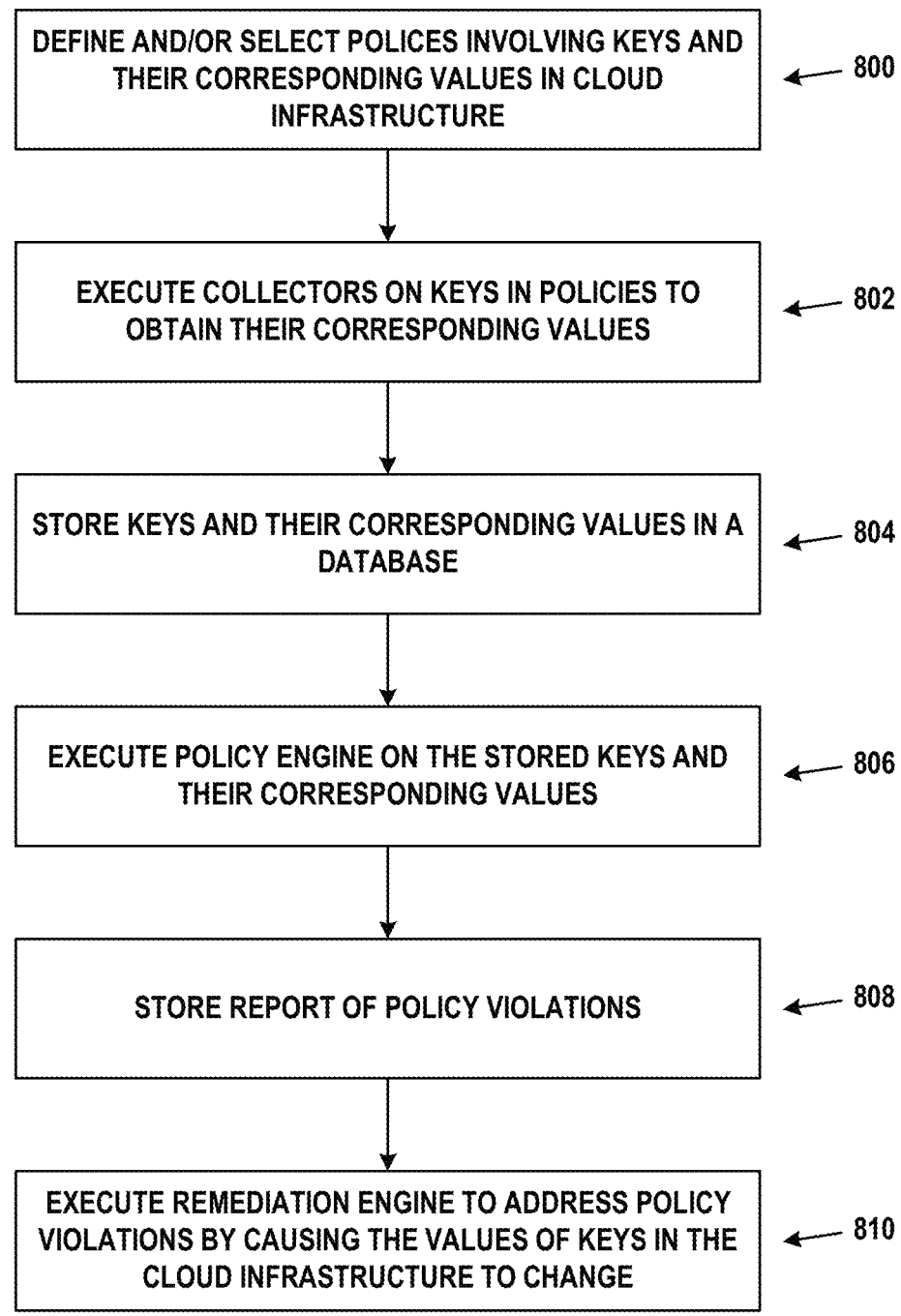
FIG. 8 depicts an example policy evaluation and remediation process, in accordance with example embodiments.

FIG. 8 depicts an example policy evaluation and remediation process as described above. As noted, such a process could be configured to execute on a schedule (e.g., every 5 minutes, 30 minutes, 60 minutes, or once per day) or may be manually triggered to execute. Alternatively, the process could be invoked in response to receiving events from a cloud provider or some other entity.

Block 800 may involve defining and/or selecting policies that involve keys and their corresponding values that are stored in cloud infrastructure. As noted, these key-value pairs may be configurable settings used by one or more cloud-based service providers. The policies may be custom designed or standardized.

Block 802 may involve executing collectors on the keys in the policies. The collectors may be one or more software modules or applications configured to retrieve the actual values of these keys from the cloud infrastructure.

Block 804 may involve storing the keys and their corresponding values in a database. Each row of a table in the database may represent a key's name, its retrieved value, and possibly related information.

In testing environments, blocks 802 and 804 could be skipped. The policies could instead be applied to previously-stored values of keys or prospective values of keys.

Block 806 may involve executing a policy engine on the stored keys and their corresponding values. The policy engine may be a software module or application configured to determine whether the values of the keys are compliant with the policies.

Block 808 may involve storing a report of any detected policy violations. Such a policy violation may be present when the value of a key is not compliant with a policy that defines one or more desired values.

Block 810 may involve executing a remediation engine to address these policy violations by causing the values of key in the cloud infrastructure to change. The remediation engine may be a software module or application configured to apply predefined remediations to cloud infrastructure and/or to notify human users of policy violations. In the case where humans are notified, an approval process may be engaged when determining and/or carrying out the remediation.

Figure 9:
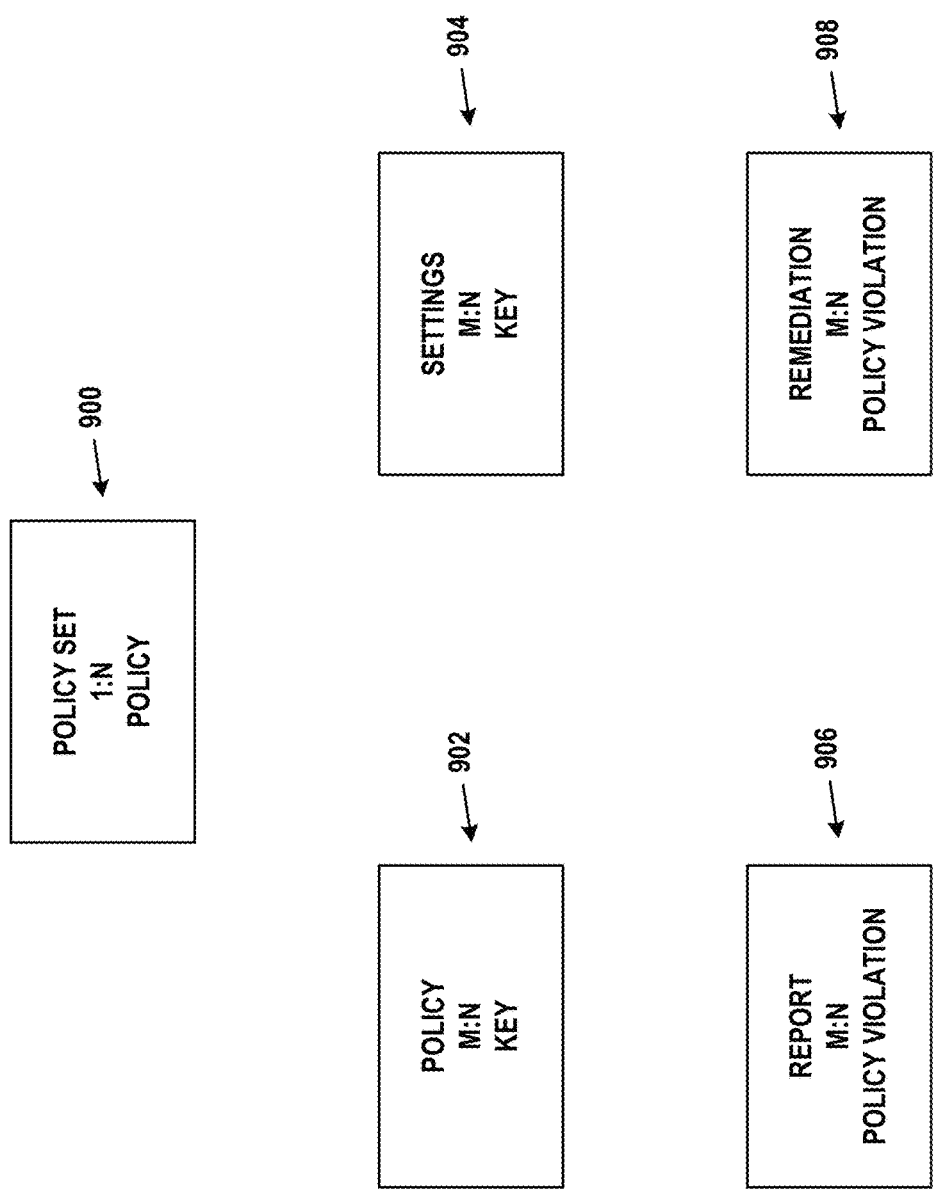
FIG. 9 depicts relationships between types of data and/or events, in accordance with example embodiments.

FIG. 9 depicts the types of relationships between various aspects of the embodiments herein. These are just a few examples of such relationships, and other relationships may exist.

Each of these relationships are defined as either 1:N or M:N. A 1:N relationship means that a single instance of one item can be associated with multiple instances of another item. An M:N relationship means that multiple instances of one item can be associated with multiple instances of another items. Herein, the variables M and N are used throughout for purposes of convenience. Thus, the values of M and N may be different in each M:N relationship. Likewise of the value of N may be different in each 1:N relationship.

Block 900 indicates that there is a 1:N relationship between a policy set and policies. Thus, multiple policies can be grouped together in a policy set. Policy sets may be logical groupings of policies that can be evaluated together by a policy engine. Examples include standard security or organization standards, such as ISO27001, AWS CIS, and Azure CIS, as well as custom groupings of policies, etc.

Block 902 indicates that there is an M:N relationship between policies and keys. Therefore, multiple policies can each involve multiple keys.

Block 904 indicates that there is an M:N relationship between settings and keys. Therefore, multiple settings in cloud infrastructure can each involve multiple keys.

Block 906 indicates that there is an M:N relationship between reports and policy violations. Therefore, multiple reports can each specify multiple policy violations.

Block 908 indicates that there is an M:N relationship between remediations and policy violations. Therefore, multiple remediations can each address multiple policy violations.

VII. Example Operations

Figure 10:
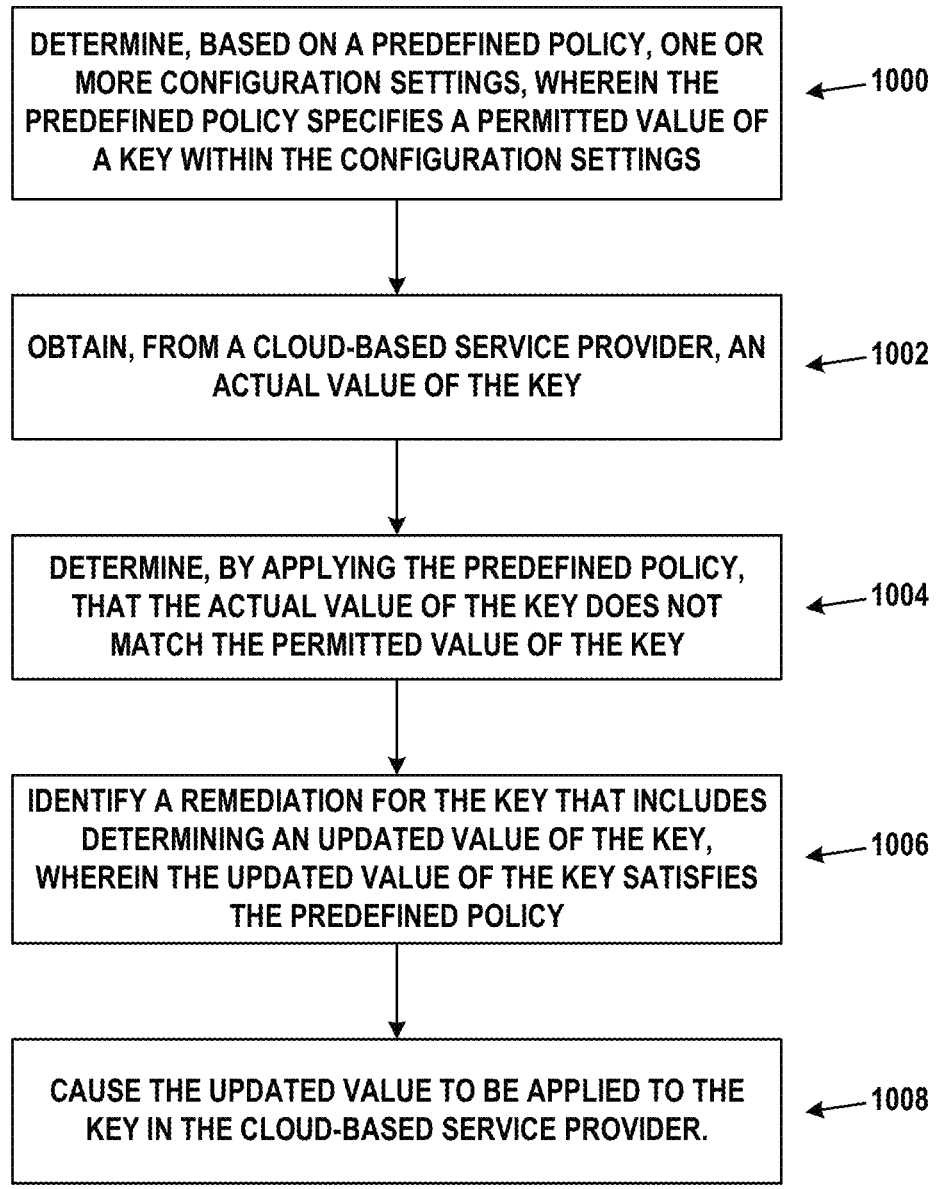
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve determining, based on a predefined policy, one or more configuration settings, wherein the predefined policy specifies a permitted value of a key within the configuration settings.

Block 1002 may involve obtaining, from a cloud-based service provider, an actual value of the key.

Block 1004 may involve determining, by applying the predefined policy, that the actual value of the key does not match the permitted value of the key.

Block 1006 may involve identifying a remediation for the key that includes determining an updated value of the key, wherein the updated value of the key satisfies the predefined policy.

Block 1008 may involve causing the updated value to be applied to the key in the cloud-based service provider.

In some embodiments, the predefined policy specifies a second permitted value of a second key within the configuration settings. These embodiments may further comprise: obtaining, from the cloud-based service provider, a second actual value of the second key; determining, by applying the predefined policy, that the second actual value of the second key does not match the second permitted value of the second key; identifying a second remediation for the second key that includes determining a second updated value of the second key, wherein the second updated value of the second key satisfies the predefined policy; and causing the second updated value to be applied to the second key in the cloud-based service provider.

In some embodiments, the predefined policy specifies a second permitted value of a second key within the configuration settings. These embodiments may further comprise: obtaining, from a second cloud-based service provider, a second actual value of the second key; determining, by applying the predefined policy, that the second actual value of the second key does not match the second permitted value of the second key; identifying a second remediation for the second key that includes determining a second updated value of the second key, wherein the second updated value of the second key satisfies the predefined policy; and causing the second updated value to be applied to the second key in the second cloud-based service provider.

In some embodiments, the one or more configuration settings relate to allocation or use of computing resources within the cloud-based service provider.

In some embodiments, the predefined policy contains define logical or algebraic conditions or tests and were specified at least in part by way of menu selections from a graphical user interface.

In some embodiments, he predefined policy is specified by an executable script that was generated at least in part by request of a user.

In some embodiments, a collector application contains one or more collector routines that are configured to be able to obtain values of specific keys from the cloud-based service provider. In these embodiments, obtaining the actual value of the key may involve: determining, based on the configuration settings, a collector routine configured to request and receive the actual value of the key from the cloud-based service provider; and storing a name of the key and the actual value of the key in a database.

In some embodiments, a policy engine application is configured to apply the predefined policy to stored keys. In these embodiments, determining that the actual value of the key does not match the permitted value of the key may involve: loading, by the policy engine application, the predefined policy; reading, by the policy engine application, the actual value of the key from the database; comparing, by the policy engine application, the actual value of the key to the permitted value of the key; and generating, by the policy engine application, a report indicating that the actual value of the key does not match the permitted value of the key.

In some embodiments, a remediation engine application is configured to determine remediations for keys with values violating the predefined policy. In these embodiments, identifying the remediation for the key may involve: identifying, by the remediation engine application and based on the report, the key; looking up, by the remediation engine application and based on the key, the remediation in a predefined set of remediations; and determining, by the remediation engine application and from the remediation, the updated value.

In some embodiments, causing the updated value to be applied to the key in the cloud-based service provider comprises executing, by the remediation engine application, program code or logic specified in the remediation that is configured apply the updated value to the key in the cloud-based service provider.

In some embodiments, causing the updated value to be applied to the key in the cloud-based service provider comprises executing, by the remediation engine application, program code or logic specified in the remediation to notify a human user of a violation of the predefined policy relating to the key.

In some embodiments, the predefined policy is associated with a schedule or frequency at which the actual value of the key is to be obtained from the cloud-based service provider and the predefined policy is to be applied to the actual value of the key.

VIII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
   determining, based on a predefined policy, one or more configuration settings, wherein the predefined policy specifies a permitted value of a key within the configuration settings;
   obtaining, from a cloud-based service provider, an actual value of the key, wherein a collector application contains one or more collector routines that are configured to be able to obtain values of specific keys from the cloud-based service provider, and wherein obtaining the actual value of the key comprises:
   determining, based on the configuration settings, a collector routine configured to request and receive the actual value of the key from the cloud-based service provider; and
   storing a name of the key and the actual value of the key in a database;
   identifying, after obtaining the actual value of the key, that the cloud-based service provider is no longer accessible;
   determining, by applying the predefined policy, while the cloud-based service provider is no longer accessible, that the actual value of the key does not match the permitted value of the key, wherein a policy engine application is configured to apply the predefined policy to stored keys, and wherein determining that the actual value of the key does not match the permitted value of the key comprises:
   loading, by the policy engine application, the predefined policy;
   reading, by the policy engine application, the actual value of the key from the database;
   comparing, by the policy engine application, the actual value of the key to the permitted value of the key; and generating, by the policy engine application, a report indicating that the actual value of the key does not match the permitted value of the key;

identifying a remediation for the key that includes determining an updated value of the key, wherein the updated value of the key satisfies the predefined policy; and causing the updated value to be applied to the key in the cloud-based service provider after the cloud-based service provider become accessible again.

2. The method of claim 1, wherein the predefined policy specifies a second permitted value of a second key within the configuration settings, the method further comprising:

obtaining, from the cloud-based service provider, a second actual value of the second key;

determining, by applying the predefined policy, that the second actual value of the second key does not match the second permitted value of the second key;

identifying a second remediation for the second key that includes determining a second updated value of the second key, wherein the second updated value of the second key satisfies the predefined policy; and causing the second updated value to be applied to the second key in the cloud-based service provider.

3. The method of claim 1, wherein the predefined policy specifies a second permitted value of a second key within the configuration settings, the method further comprising:

obtaining, from a second cloud-based service provider, a second actual value of the second key;

determining, by applying the predefined policy, that the second actual value of the second key does not match the second permitted value of the second key;

identifying a second remediation for the second key that includes determining a second updated value of the second key, wherein the second updated value of the second key satisfies the predefined policy; and causing the second updated value to be applied to the second key in the second cloud-based service provider.

4. The method of claim 1, wherein the one or more configuration settings relate to allocation or use of computing resources within the cloud-based service provider.

5. The method of claim 1, wherein the predefined policy contains define logical or algebraic conditions or tests and were specified at least in part by way of menu selections from a graphical user interface.

6. The method of claim 1, wherein the predefined policy is specified by an executable script that was generated at least in part by request of a user.

7. The method of claim 1, wherein a remediation engine application is configured to determine remediations for keys with values violating the predefined policy, and wherein identifying the remediation for the key comprises:

identifying, by the remediation engine application and based on the report, the key;

looking up, by the remediation engine application and based on the key, the remediation in a predefined set of remediations; and determining, by the remediation engine application and from the remediation, the updated value.

8. The method of claim 7, wherein causing the updated value to be applied to the key in the cloud-based service provider comprises:

executing, by the remediation engine application, program code or logic specified in the remediation that is configured apply the updated value to the key in the cloud-based service provider.

9. The method of claim 7, wherein causing the updated value to be applied to the key in the cloud-based service provider comprises:

executing, by the remediation engine application, program code or logic specified in the remediation to notify a human user of a violation of the predefined policy relating to the key.

10. The method of claim 1, wherein the predefined policy is associated with a schedule or frequency at which the actual value of the key is to be obtained from the cloud-based service provider and the predefined policy is to be applied to the actual value of the key.

11. A non-transitory computer-readable medium, having stored thereon program instructions that, upon execution by a computing system, cause the computing system to perform operations comprising:

determining, based on a predefined policy, one or more configuration settings, wherein the predefined policy specifies a permitted value of a key within the configuration settings;

obtaining, from a cloud-based service provider, an actual value of the key, wherein a collector application contains one or more collector routines that are configured to be able to obtain values of specific keys from the cloud-based service provider, and wherein obtaining the actual value of the key comprises:

determining, based on the configuration settings, a collector routine configured to request and receive the actual value of the key from the cloud-based service provider; and storing a name of the key and the actual value of the key in a database;

identifying, after obtaining the actual value of the key, that the cloud-based service provider is no longer accessible;

determining, by applying the predefined policy, while the cloud-based service provider is no longer accessible, that the actual value of the key does not match the permitted value of the key, wherein a policy engine application is configured to apply the predefined policy to stored keys, and wherein determining that the actual value of the key does not match the permitted value of the key comprises:

loading, by the policy engine application, the predefined policy;

reading, by the policy engine application, the actual value of the key from the database;

comparing, by the policy engine application, the actual value of the key to the permitted value of the key; and generating, by the policy engine application, a report indicating that the actual value of the key does not match the permitted value of the key;

identifying a remediation for the key that includes determining an updated value of the key, wherein the updated value of the key satisfies the predefined policy; and causing the updated value to be applied to the key in the cloud-based service provider after the cloud-based service provider become accessible again.

12. The non-transitory computer-readable medium of claim 11, wherein the one or more configuration settings relate to allocation or use of computing resources within the cloud-based service provider.

13. The non-transitory computer-readable medium of claim 11, wherein the predefined policy contains define logical or algebraic conditions or tests and were specified at least in part by way of menu selections from a graphical user interface.

14. The non-transitory computer-readable medium of claim 11, wherein the predefined policy is specified by an executable script that was generated at least in part by request of a user.

15. The non-transitory computer-readable medium of claim 11, wherein a remediation engine application is configured to determine remediations for keys with values violating the predefined policy, and wherein identifying the remediation for the key comprises:
- identifying, by the remediation engine application and based on the report, the key;
- looking up, by the remediation engine application and based on the key, the remediation in a predefined set of remediations; and
- determining, by the remediation engine application and from the remediation, the updated value.

16. A system comprising:
one or more processors; and
memory, containing program instructions that, upon execution by the one or more processors, cause the system to perform operations comprising:
- determining, based on a predefined policy, one or more configuration settings, wherein the predefined policy specifies a permitted value of a key within the configuration settings;
- obtaining, from a cloud-based service provider, an actual value of the key, wherein a collector application contains one or more collector routines that are configured to be able to obtain values of specific keys from the cloud-based service provider, and wherein obtaining the actual value of the key comprises:
  - determining, based on the configuration settings, a collector routine configured to request and receive the actual value of the key from the cloud-based service provider; and
- storing a name of the key and the actual value of the key in a database;
- identifying, after obtaining the actual value of the key, that the cloud-based service provider is no longer accessible;
- determining, by applying the predefined policy, while the cloud-based service provider is no longer accessible, that the actual value of the key does not match the permitted value of the key, wherein a policy engine application is configured to apply the predefined policy to stored keys, and wherein determining that the actual value of the key does not match the permitted value of the key comprises:
  - loading, by the policy engine application, the predefined policy;
  - reading, by the policy engine application, the actual value of the key from the database;
  - comparing, by the policy engine application, the actual value of the key to the permitted value of the key; and
- generating, by the policy engine application, a report indicating that the actual value of the key does not match the permitted value of the key;
- identifying a remediation for the key that includes determining an updated value of the key, wherein the updated value of the key satisfies the predefined policy; and
- causing the updated value to be applied to the key in the cloud-based service provider after the cloud-based service provider become accessible again.

* * * * *